Aug. 12, 1941.   R. C. PIERCE   2,252,353
REEL MOUNTING
Filed Sept. 29, 1938   2 Sheets-Sheet 2

INVENTOR.
ROBERT C. PIERCE
BY McConkey Dawson & Booth
ATTORNEYS.

Patented Aug. 12, 1941

2,252,353

UNITED STATES PATENT OFFICE 2,252,353

REEL MOUNTING

Robert C. Pierce, Niles, Mich., assignor to National Standard Company, Niles, Mich., a corporation of Michigan Application September 29, 1938, Serial No. 232,268

4 Claims. (Cl. 242—45)

This invention relates to a reel mounting and more particularly to means for mounting and driving the wind-up reel of a wire drawing machine.

One of the objects of the invention is to provide reel mounting mechanism by which a reel may be mounted or dismounted quickly and easily. According to one important feature the mounting mechanism is readily adjustable to accommodate reels of different sizes.

Another object of the invention is to provide reel mounting mechanism in which the reel is driven and can overrun the driving means for starting a wire or like strand thereon or for taking up slack.

Still another object of the invention is to provide reel mounting mechanism for a wire drawing machine in which the speed of driving the reel is controlled by the tension of the wire.

Other objects, advantages and novel features of the invention will be apparent from the following description when read in connection with the accompanying drawings, in which.

Figure 1:
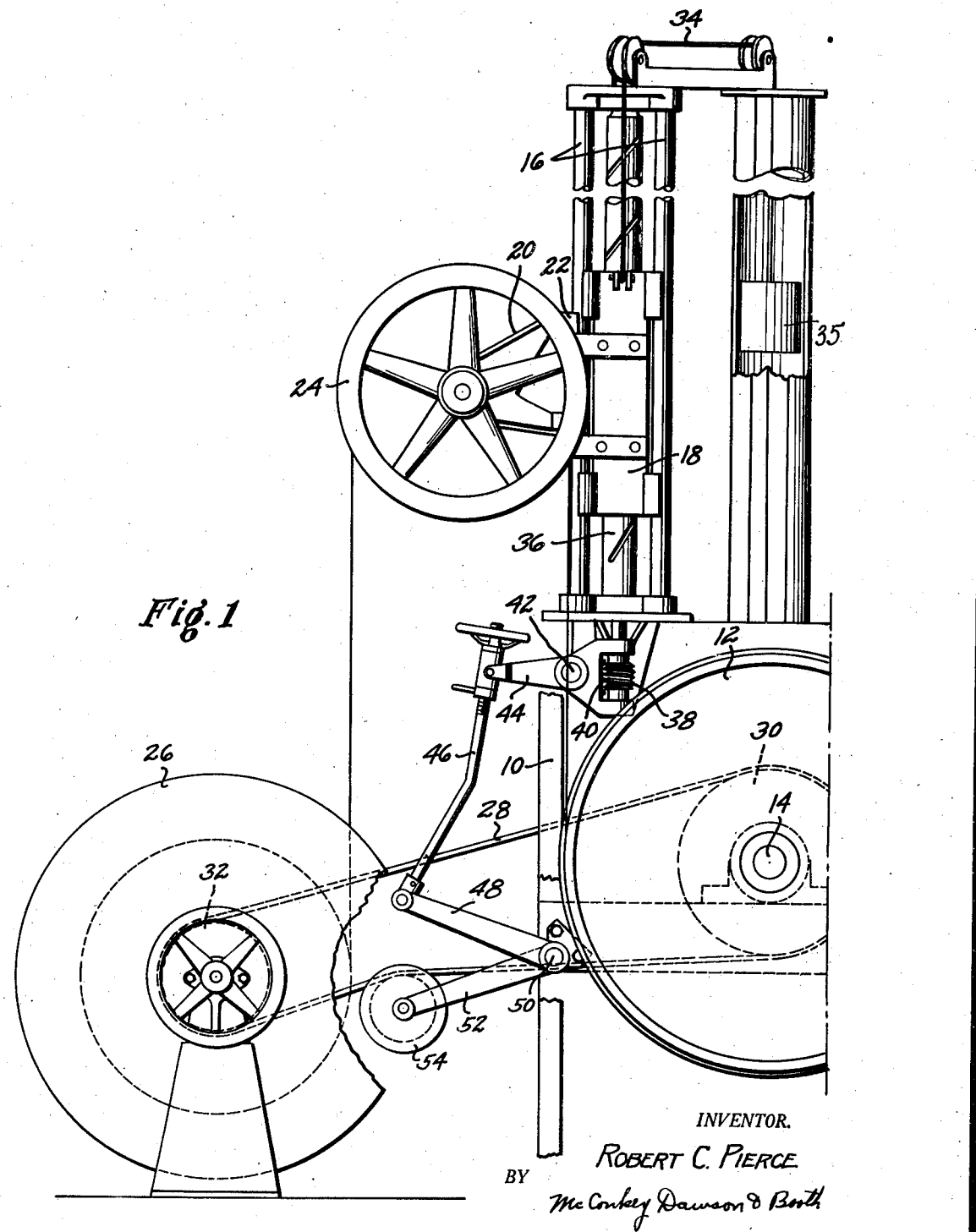
Figure 1 is a partial elevation of a wire drawing machine embodying the invention.

Referring more particularly to Figure 1, there is shown therein a portion of the last unit of a multiple die wire drawing machine including a frame 10 having mounted on one side thereof a capstan 12 driven by a shaft 14 and adapted to draw the wire through a die. The frame 10 carries a pair of vertical guide rods 16 supporting a slide block 18 which carries a frame 20 about a vertical pivot 22. A sheave or pulley 24 is mounted on the frame 20 and receives wire from the capstan 12 and feeds it to a reel 26. Preferably a level wind mechanism of the type more particularly disclosed and claimed in my copending application Serial No. 232,266, filed September 29, 1938, which matured into Patent 2,185,309, Jan. 2, 1940, is provided between the sheave 24 and reel 26 to guide the wire on to the reel.

The reel is driven by belt 28 passing around a pulley 30 on the shaft 14 and a pulley 32 arranged to drive the reel 26 as will be explained more fully hereinafter.

The block 18 is normally urged downwardly by tension in the wire and is urged upwardly by a cable or the like 34 passing over pulleys at the top of the guide rods 16 and normally held in tension by a weight 35. Thus the block 18 will be moved up and down on the guide rods in accordance with variations in the tension of the wire between the capstan 12 and the reel 26.

Driving of the reel is controlled by a rotatable shaft 36 passing through the block 18 and having a spiral groove therein engaged by a suitable tongue not shown on the block 18 to rotate the shaft as the block slides vertically. A worm 38 carried by the shaft 36 meshes with a gear segment 40 on a shaft 42 to which an arm 44 is secured. As the slide 18 moves down, the worm 38 is turned in a direction to rock the arm 44 counterclockwise. An adjustable link 46 connects the arm 44 with a lever 48 secured to a rock shaft 50 journaled in the frame 10. An arm 52 secured to the rock shaft carries an idler pulley 54 which engages the belt 28. When the reel is rotating faster than wire is supplied, block 18 is pulled downwardly swinging the pulley 54 away from the belt thereby loosening it and permitting it to slip so that the reel is driven more slowly. Opposite movement of the block 18 increases the tension of the belt, thereby increasing the speed of the reel.

Figure 2:
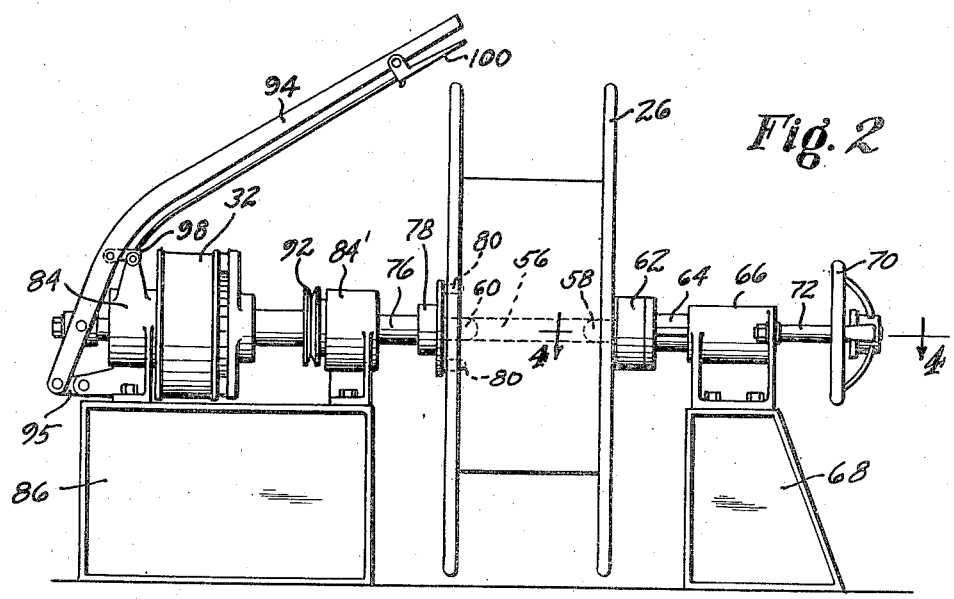
Figure 2 is a partial end elevation looking from the left of Figure 1 showing the reel mounting.
Figure 3:
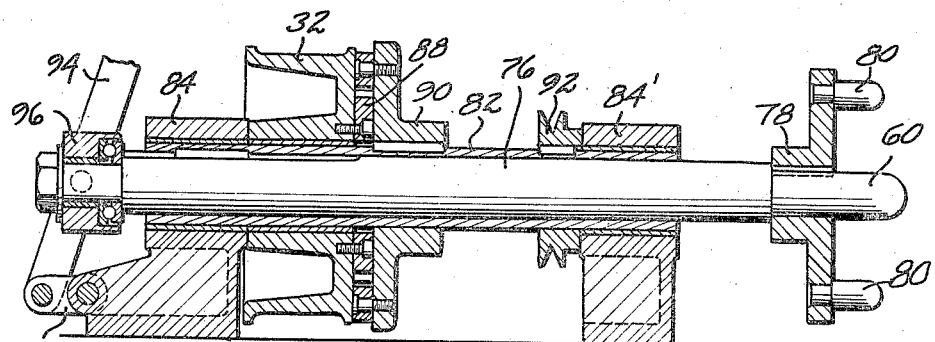
Figure 3 is a partial section through a portion of the reel mounting mechanism.
Figure 4:
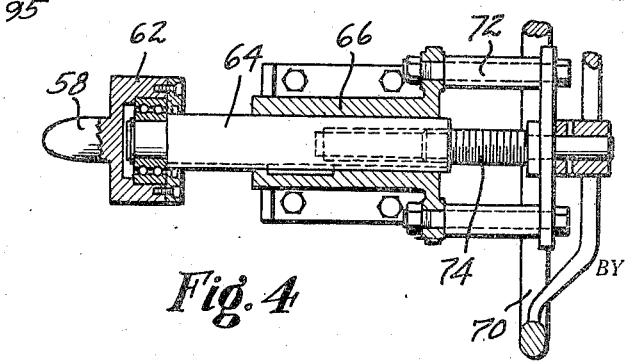
Figure 4 is a section on the line 4—4 of Figure 2.

The reel mounting is illustrated more particularly in Figures 2, 3 and 4. As shown therein, the reel is provided with a center bore 56 and is supported on opposite sides by stub shafts 58 and 60 projecting into the bore. The stub shaft 58 is freely mounted on a ball bearing member 62 on the end of a shaft 64 keyed against rotation but slidably mounted in the bore of a bracket 66 which is supported by a pedestal 68. A hand wheel 70 rotatably supported on a yoke 72 bolted to the bracket 66 is provided with a screw threaded shaft 74 threaded into a tapped bore in the shaft 64 so that rotation of the hand wheel slides the shaft 64 in the bracket.

The stub shaft 60 on the other side of the reel is formed integrally with a shaft 76 and has keyed to it a flange member 78 carrying a pair of pins 80 for drivably engaging a pair of driving holes in the side of the reel. The shaft 76 is slidably keyed in a sleeve 82 rotatably supported by a pair of pillow blocks 84 and 84' mounted on a pedestal 86. The pulley 32 is rotatably mounted on the sleeve 82 and is connected through a ratchet mechanism 88 with a flange 90 keyed to the sleeve. The ratchet is arranged to drive the sleeve and shaft 76 from the pulley in a direction to wind up the wire on the reel but to permit the reel to be moved in a direction to wind up the wire relative to the pulley. A pulley 92 is secured to the sleeve 82 and is adapted to drive the level winding mechanism.

The shaft 76 is shifted by a lever 94 swingably mounted on a link 95 pivoted to the pillow block 84 and connected through a ball bearing member 96 to the end of the shaft 76. A latch 98 on the lever 94 operated by a hand member 100 engages a stationary part on the pillow block 84 to hold the lever and shaft in position when the reel is mounted.

In mounting a reel on the machine the empty reel is rolled into place and is raised to a position in which its bore 56 is alined with the stub shafts 58 and 60 by suitable jacking or elevating mechanism. The lever 94 may then be moved to the position shown in Figure 2 to force the stub shaft 60 into the bore 56 and driving pins 80 into the driving openings in the reel. If the pins are not alined with the driving openings in the reel, the shaft 76 may readily be turned to bring them into alinement due to the ratchet mechanism 88.

In some cases as where a relatively light reel is employed, the stub shaft 58 need not be moved except to adjust it for reels of different sizes. However, when the reel is very heavy or when it is desired for some other reason, hand wheel 70 may be turned to move the stub shaft 58 into engagement with the reel.

Upon starting the machine, the reel will be driven through belt 28, pulley 32 and shaft 76 to wind up the wire from the machine. As explained above, tension on the belt 28 will be controlled so that the wire will be wound under substantially constant tension.

This application is a continuation in part of my co-pending application Serial No. 68,856 filed March 14, 1936, matured into Patent No. 2,162,357 June 13, 1939.

While one embodiment of the invention has been shown and described in detail, it will be understood that numerous changes might be made therein and it is not intended to limit the scope of the invention to the exact form shown nor otherwise than by the terms of the appended claims.

What is claimed is:

1. In a wire drawing machine, a reel mounting comprising a pair of oppositely disposed pedestals, a bracket on one of said pedestals, a shaft axially slidable in said bracket, a worm and hand wheel for sliding said shaft in the bracket, a stub shaft mounted on ball bearings on the end of said shaft and adapted to rotatably support one end of a reel, a pair of pillow blocks on the other pedestal coaxial with said shaft, a sleeve journalled in said blocks, a second shaft keyed in said sleeve and axially slidable therein, a lever for sliding said shaft in said sleeve, a stub shaft integral with said second shaft and adapted to support the other end of a reel, a flange mounted on said second stub shaft provided with a pair of projections for drivably engaging a reel, a drive pulley freely mounted on the sleeve, and a one-way drive connection between said pulley and said sleeve.

2. A reel mounting for a wire drawing machine or the like comprising a pair of oppositely disposed pedestals, a shaft rotatably carried by one of said pedestals and adapted rotatably to support one end of a reel, a shaft rotatably and slidably supported by the other pedestal and adapted to support the other end of the reel, means carried by said last named shaft for drivably connecting a reel thereto, a driving member slidably mounted on said last named shaft and a one-way drive connection between said driving member and the shaft.

3. A reel mounting for a wire drawing machine or the like comprising a pair of oppositely disposed pedestals, a shaft rotatably carried by one of said pedestals and adapted rotatably to support one end of a reel, a shaft rotatably and slidably supported by the other pedestal and adapted to support the other end of the reel, means carried by said last named shaft for drivably connecting a reel thereto, a member splined to said last named shaft for sliding but non-rotative movement relative thereto, a drive pulley freely mounted on the shaft, and a one-way drive connection between said drive pulley and said member.

4. In a wire drawing machine having a part movable in accordance with variations in the tension of the wire, reel mounting and driving means comprising a pair of oppositely disposed rotatable shafts to support a reel, a pulley rotatably mounted on one of said shafts, one way drive means connecting the pulley to said one shaft, a driving belt passing around said pulley, and means controlled by movement of said part to vary the tension of the belt.

ROBERT C. PIERCE.